Patented Jan. 16, 1923.

1,442,317

UNITED STATES PATENT OFFICE.

CHARLES T. WHITTIER, OF JERSEY CITY, NEW JERSEY, ASSIGNOR TO ROYAL BAKING POWDER COMPANY, OF NEW YORK, N. Y., A CORPORATION OF NEW JERSEY.

PROCESS FOR THE RECOVERY OF VALUABLE CONSTITUENTS FROM CERTAIN WASTE LIQUORS.

No Drawing.   Application filed May 21, 1920.   Serial No. 383,209.

*To all whom it may concern:*

Be it known that I, CHARLES T. WHITTIER, a citizen of the United States, residing at Jersey City, in the county of Hudson and State of New Jersey, have invented a new and useful Process for the Recovery of Valuable Constituents from Certain Waste Liquors, of which the following is a specification.

The invention relates to a process of recovering valuable substances from waste liquors which contain other substances interfering with concentration by evaporation. The invention has been made in connection with the recovery of potassium sulphate from the waste liquor resulting from the manufacture of tartaric acid. Such liquors contain, among other things, in addition to the valuable constituents, a considerable amount of calcium sulphate and organic matter, including albuminoids, etc. Calcium sulphate being less soluble in hot water than in cold, forms scales or incrustations on the apparatus when the attempt is made to evaporate the liquor by concentration methods, to such an extent as materially to interfere with, or prevent, successful operation. The organic matter in the liquor coagulates, with the result that it forms a viscous mass exceedingly difficult to handle. Chiefly by reason of the presence of these substances, quantities of valuable potash have been run to waste in such liquors, notwithstanding efforts to recover it. The object of the present invention is to provide a method of treating such liquors which avoids the difficulties presented by the calcium sulphate and organic matter and permits the recovery of the valuable constituents economically and effectively.

The process comprises taking the waste liquor at a temperature low enough to avoid interfering precipitation of the calcium sulphate or coagulation of the organic matter, and while these interfering substances are in solution, atomizing or spraying the liquor into heated air, or waste furnace gas, in volume sufficient to remove the moisture. The removal of the moisture of some liquids by atomizing or spraying into a current of heated air has been practiced, as, for instance, in the manufacture of dry milk; and apparatus for practicing it has been fully described and is available. My invention is based upon the discovery that the heretofore insuperable difficulties in treating waste potash liquor, presented by the presence of calcium sulphate and organic matter, may be overcome and the valuable constituents therein easily recovered by atomizing or spraying the liquor while at a temperature sufficiently low to avoid interfering precipitation of the calcium sulphate or coagulation of the organic matter into sufficient dry or warm air to remove the moisture.

I claim:—

1. The process of recovering potassium compounds from waste potash liquor resulting from the manufacture of tartaric acid which comprises maintaining the temperature of a supply of the liquor low enough to avoid precipitation of calcium sulphate or coagulation of organic matter and atomizing or spraying the liquor into a volume of dry air sufficient to remove the moisture therefrom.

2. The process of evaporating liquor containing calcium sulphate which comprises atomizing or spraying the liquor into a volume of heated air sufficient to remove the moisture, said liquor immediately previous to atomizing being at a temperature low enough to prevent precipitation of calcium sulphate.

3. A process for recovering potassium compounds from waste potash liquor resulting from the manufacture of tartaric acid, comprising spraying the liquor into dry air to remove the moisture therefrom.

CHARLES T. WHITTIER.